(12) United States Patent
Kawakami

(10) Patent No.: US 8,235,370 B2
(45) Date of Patent: Aug. 7, 2012

(54) CLAMP DEVICE

(75) Inventor: Takayuki Kawakami, Itami (JP)

(73) Assignee: Pascal Engineering Corporation, Hyogo (JP)

( * ) Notice: Subject to any disclaimer, the term of this patent is extended or adjusted under 35 U.S.C. 154(b) by 116 days.

(21) Appl. No.: 12/735,626

(22) PCT Filed: Jan. 22, 2009

(86) PCT No.: PCT/JP2009/000234
§ 371 (c)(1),
(2), (4) Date: Aug. 3, 2010

(87) PCT Pub. No.: WO2009/101764
PCT Pub. Date: Aug. 20, 2009

(65) Prior Publication Data
US 2010/0320664 A1 Dec. 23, 2010

(30) Foreign Application Priority Data

Feb. 15, 2008 (JP) .................................. 2008-034920
Apr. 10, 2008 (JP) .................................. 2008-102346

(51) Int. Cl.
*B23Q 3/00* (2006.01)
*B23Q 3/08* (2006.01)
*B25B 1/14* (2006.01)
*B25B 5/12* (2006.01)

(52) U.S. Cl. ............ 269/310; 269/309; 269/24; 269/27; 269/28; 269/228; 269/289 R; 269/32

(58) Field of Classification Search .................. 269/309, 269/310, 24, 27, 28, 228, 289 R, 32
See application file for complete search history.

(56) References Cited

U.S. PATENT DOCUMENTS

| 6,095,509 A * | 8/2000 | Yonezawa ..................... 269/309 |
| 6,988,720 B2 | 1/2006 | Kawakami |
| 2005/0017424 A1 | 1/2005 | Migliori |

(Continued)

FOREIGN PATENT DOCUMENTS

DE 40 20 981 1/1992

(Continued)

OTHER PUBLICATIONS

Ikuta, Kunio; Workpiece removing method, locating device and workpiece positioning device. Machine Translation of JP 2006263885.*

(Continued)

*Primary Examiner* — Monica Carter
*Assistant Examiner* — Nirvana Deonauth
(74) *Attorney, Agent, or Firm* — Jordan and Hamburg LLP

(57) ABSTRACT

A clamp device includes a grip member, a clamp rod, and a hydraulic cylinder, and, by the grip member being inserted into an hole in a workpiece, it can grip the inner circumferential surface of the hole. The clamp device is provided with: a main body member; seating surfaces formed upon the main body member, upon which the workpiece is seated; a seating sensor that includes a pressurized air ejection hole opening to the seating surfaces; and a workpiece mounting surface that can receive and stop a workpiece at a position that is more advanced than the seating surfaces when the grip member is at an advanced position (its unclamped state), and that shifts together with the grip member during clamp operation when the grip member and the clamp rod shift towards retraction.

7 Claims, 8 Drawing Sheets

U.S. PATENT DOCUMENTS

2005/0121846 A1  6/2005  Kawakami
2009/0315239 A1  12/2009  Yonezawa et al.

FOREIGN PATENT DOCUMENTS

| JP | 11-188551 | 7/1999 |
| JP | 2003-266262 | 9/2003 |
| JP | 2004-195583 | 7/2004 |
| JP | 3550010 | 8/2004 |
| JP | 3-106769 | 1/2005 |
| WO | WO-2007/060986 | 5/2007 |
| WO | WO-2007/074737 | 7/2007 |

OTHER PUBLICATIONS

U.S. Appl. No. 12/735,627, Takayuki Kawakami, filed Aug. 3, 2010.
U.S. Appl. No. 12/736,493, Takayuki Kawakami, filed Oct. 13, 2010.

* cited by examiner

CLAMP DEVICE

TECHNICAL FIELD

The present invention relates to a clamp device, and in particular relates to a clamp device for clamping a workpiece by engaging a grip claw of a grip member into a hole in the workpiece and pulling the workpiece against a seating surface.

BACKGROUND OF THE INVENTION

In a case where machining processing is performed over all the surfaces of a workpiece, a clamp device as described above (so called hole clamp device) is employed, since it is not possible to employ a clamp device of the type that presses from above with a pressing implement upon an end portion of the workpiece. With such a clamp device, a seating surface is formed on a body member, on which the workpiece to be the object of clamping is seated. When the workpiece is to be loaded, the workpiece is mounted on this seating surface and is supported thereupon, and a grip member and a clamp rod having a tapered shaft portion inserted into the grip member are inserted into a hole in the workpiece. And next, after increasing the diameter of a grip claw and engaging it against the inner circumferential surface of the hole with the tapered shaft portion by pulling the clamp rod towards the seating surface, the workpiece is fixed against the seating surface by further pulling this grip member towards the seating surface.

Clamp devices like the one described above are disclosed in Patent Documents #1 and #2.

In particular, with the clamp device described in Patent Document #1, in order to cope with variations in the position of the hole in the workpiece, the grip member and the clamping rod having a tapered shaft portion, are adapted to be movable in directions orthogonal to the axis, thereby it is possible to perform reliable clamping, even if the position of the hole in the workpiece is deviated more or less from its proper original position.

Now, generally, often a seating sensor is provided to the seating surface of a clamp device, in order, when fixing a workpiece with the clamp device, to detect whether or not the workpiece has been fixed in the state of being correctly seated to the seating surface. This seating sensor comprises a pressurized air ejection hole that opens to the seating surface, an air supply passage that supplies pressurized air to this pressurized air ejection hole, a pressure switch that detects whether the air pressure within this air supply passage has risen to at least a predetermined pressure, and so on.
Patent Document #1: Japanese Pat. No. 3,550,010 Publication
Patent Document #2: German Pat. No. 4,020,981 Publication If a seating surface that receives and stops the workpiece and a seating sensor are provided to such a clamp device, then the pressurized air ejection hole of the seating sensor is closed by the wall surface of the workpiece when the workpiece is loaded and seated upon the seating surface. Accordingly, irrespective of whether or not the clamp operation to fix the workpiece is completed, the seating sensor undesirably detects that the workpiece is seated, so that there has been the problem of mistaken determination that the operation of clamping the workpiece has been completed.

Furthermore, with the clamp device of Patent Document #1, in order to make it possible to perform clamping even if the position of the hole in the workpiece is deviated more or less from its proper position, the grip member and the clamp rod having the taper shaft portion are made to be movable in directions orthogonal to their axis. However, no mechanism is provided for returning the grip member and the clamp rod to their original positions (i.e. their center positions) when clamping operation is performed in a state where the grip member and the clamp rod are shifted in a direction orthogonal to the axis, and thereafter the device returns to the unclamped state. Accordingly, it is necessary to perform the troublesome task of manually returning the grip member and the clamp rod to their original positions, and, if this task of returning is neglected, it becomes difficult to insert the grip member and the clamp rod into a hole in a workpiece, and the working efficiency for fixing workpieces decreases.

Apart from this, as described above, when a workpiece is to be clamped with a hole clamp device, in correspondence to the fact that, during clamping, the grip member and the clamp rod are inserted into the hole in the workpiece and the diameter of a grip claw of the grip member is increased, during unclamping, the diameter of the grip claw of the grip member is reduced by the biasing force of an O-ring or the like. However there is the problem that, if the grip claw should bite into the inner surface of the hole in the workpiece, it is not possible reliable to reduce the diameter of the grip claw only with the biasing force due to the O-ring.

An object of the present invention is to provide a clamp device which, directly after loading a workpiece, support this workpiece upon a workpiece mounting surface that shifts integrally with a grip member during clamping operation, and seat the workpiece on a seating surface in a clamped state.

The clamp device according to the present invention comprises an annular grip member capable of expanding and shrinking in a radial direction and moreover of being inserted into a hole in a workpiece and of gripping an inner circumferential surface of the hole, a clamp rod having a tapered shaft portion fitted into and engaged with the grip member, and a fluid pressure cylinder for driving the grip member and the clamp rod forwards and backwards in an axial direction, and is characterized by comprising: a main body member to which the grip member, the clamp rod, and the fluid pressure cylinder are attached; a seating surface formed on the main body member for seating the workpiece; a seating sensor including a pressurized air ejection hole that opens to the seating surface; and a workpiece mounting surface that, when the grip member is at an advanced position in which the grip member is shifted towards the workpiece, can receive and stop the workpiece at a position that is more advanced than the seating surface; and that, during clamp operation in which the grip member and the clamp rod are shifted towards retraction, shifts integrally with the grip member in a direction that is parallel to an axis of the clamp rod.

With this clamp device, when in the unclamped state the workpiece that is to be the object of clamping is loaded, this workpiece is supported on the workpiece mounting surface that is in a position that is more advanced than the seating surface. And when, from this state, the grip member and the clamp rod are driven by the fluid pressure cylinder in the retraction direction to seat and clamp the workpiece, the workpiece mounting surface is shifted towards retraction integrally with the grip member, the state in which the workpiece is seated upon the seating surface is established, and the state of this workpiece fixation is detected by the seating sensor.

According to the present invention, since this clamp device that includes the grip member, the clamp rod, and the fluid pressure cylinder is provided with the main body member, the seating surface formed on the main body member, and the seating sensor, and since the workpiece mounting surface is provided that, when the grip member is in an advanced position that is shifted towards the workpiece, is capable of receiving and stopping the workpiece in a position that is more advanced than the seating surface, accordingly, after the workpiece that is to be the object of clamping has been loaded and before it is clamped, it is possible to support this workpiece on the workpiece mounting surface.

Accordingly, it is possible reliably to prevent the seating sensor operating before clamping. Moreover, the workpiece is seated against the seating surface when the workpiece has been clamped and fixed, and has been fixed in a properly clamped state, it is possible reliably to detect with the seating sensor that the workpiece is fixed in a state in which it is properly seated against the seating surface.

In addition to the structure of the present invention as described above, it would also be acceptable to arrange to employ various further structures, as follows.

(1) The workpiece mounting surface may be formed on the grip member. Since, according to this structure, the workpiece mounting surface is formed on the grip member, accordingly it is possible, during clamping operation, to shift it integrally with the grip member in a direction parallel to the axis thereof.

(2) The workpiece mounting surface may be formed on one or a plurality of workpiece mounting surface forming members that are arranged around the external circumference of the grip member. According to this structure, it is possible to simplify the structure of the grip member by forming one or a plurality of workpiece mounting surface forming members arranged around the outside of the external circumference of the grip member.

(3) The grip member and the clamp rod may be disposed to be movable in directions orthogonal to the axis. According to this structure, even if the position of the hole deviates slightly due to an error while manufacturing the workpiece, still it is possible to perform clamping, via a shift of the grip member and the clamp rod in a direction orthogonal to the axis.

(4) There may be further included an elastic biasing means that elastically biases the grip member and the clamp rod so that the common axis of the grip member and the clamp rod coincides with the axis of the fluid pressure cylinder. According to this structure, when the clamp member is in the unclamped state, the common axis of the grip member and the clamp rod is elastically biased by the elastic biasing means so as to coincide with the axis of the fluid pressure cylinder, and the grip member and the clamp rod automatically return to their original positions in which these two axes agree with one another. Due to this, there is no requirement to perform the troublesome task of returning the grip member and the clamp rod back to their original positions by manual operation.

(5) The fluid pressure cylinder may include: a cylinder bore; a piston member that is installed in this cylinder bore and is linked to the clamp rod; a tubular piston rod that is formed on the piston member; a clamping fluid chamber that is defined within the cylinder bore on a side of the tubular piston rod, and an unclamping fluid chamber that is defined within the cylinder bore on an opposite side to the clamping fluid chamber relative to a piston portion of the piston member; and an annular pressure receiving member that is fitted on the exterior of the tubular piston rod and is movable in a direction parallel to the axis of the clamp rod while being capable of receiving the fluid pressure in the clamping fluid chamber, and that receives and stops a base end surface of the grip member. According to this structure, in the state in which the grip member is supported by the annular pressure receiving member, the clamp rod is driven and radially expands the grip member, and thereafter it is possible to drive the grip member and the clamp rod in the direction to seat and clamp the workpiece.

(6) There may be further comprising an elastic biasing means including an elastic ring member that is installed between the tubular piston rod and the clamp rod in a compressed state, in order to make the common axis of the grip member and the clamp rod coincide with the axis of the fluid pressure cylinder. According to this structure, it is possible to implement the elastic biasing means with a simple structure.

(7) The elastic biasing means may include a scraper made from an elastic material, which is slidable on an outer circumferential surface of an annular guard portion of the grip member and elastically biases the grip member and the clamp rod. According to this structure, the scraper also serves as the elastic biasing means, and it is possible to implement the elastic biasing means with a simple structure.

(8) The grip member may include an annular guard portion on which the workpiece mounting surface is formed, a grip claw portion that extends in the advance direction from this annular guard portion, and a base end guard portion that is formed on an opposite side to the grip claw portion relative to the annular guard portion; and the grip member is consisting of a plurality of separated grip members which are divided at a plurality of positions around its circumferential direction. According to this structure, it is easy for the grip member to increase in diameter during clamping, and moreover it is easy for the grip member to reduce in diameter during clamping release.

(9) The annular pressure receiving member may be disposed to be shiftable in a direction parallel to the axis of the clamp rod through a predetermined stroke between a first position in which the workpiece mounting surface is at a position that is advanced more than the seating surface in the advance direction, and a second position in which the workpiece mounting surface is at a position that is retracted behind the seating surface. According to this structure it is possible reliably to seat the workpiece upon the seating surface while the workpiece is clamped and fixed, since, after the workpiece that is to be the object of clamping has been loaded and before it is clamped, this workpiece is reliably supported by the workpiece mounting surface.

(10) The fluid pressure cylinder may be adapted, during clamping, to drive the clamp rod in the retraction direction, and, during clamping release, to drive the clamp rod in the advance direction; with there being further provided a diameter reduction mechanism that, during the clamping release, establishes a diameter reduced state in which the plurality of separated grip members of the grip member are made to approach towards the clamp rod. According to this structure, during clamping release, it is possible reliable to reduce the diameter of the plurality of separated grip members.

(11) And the diameter reduction mechanism may include a tapered surface formed upon the base end portion of the grip member so as to reduce in diameter downward, and a tapered engagement portion that is formed upon the clamp rod so as to be capable of engaging from below with the tapered surface, and that increases in diameter upward. According to this structure, due to the guidance operation of the tapered surface of the grip member and the tapered engagement portion of the clamp rod, a force for diameter reduction acts from the clamp rod upon the base end point of the grip member, so that during clamping release it is easy reliably to reduce the diameter of the plurality of separated grip members.

DESCRIPTION OF NUMERALS

Figure 1:
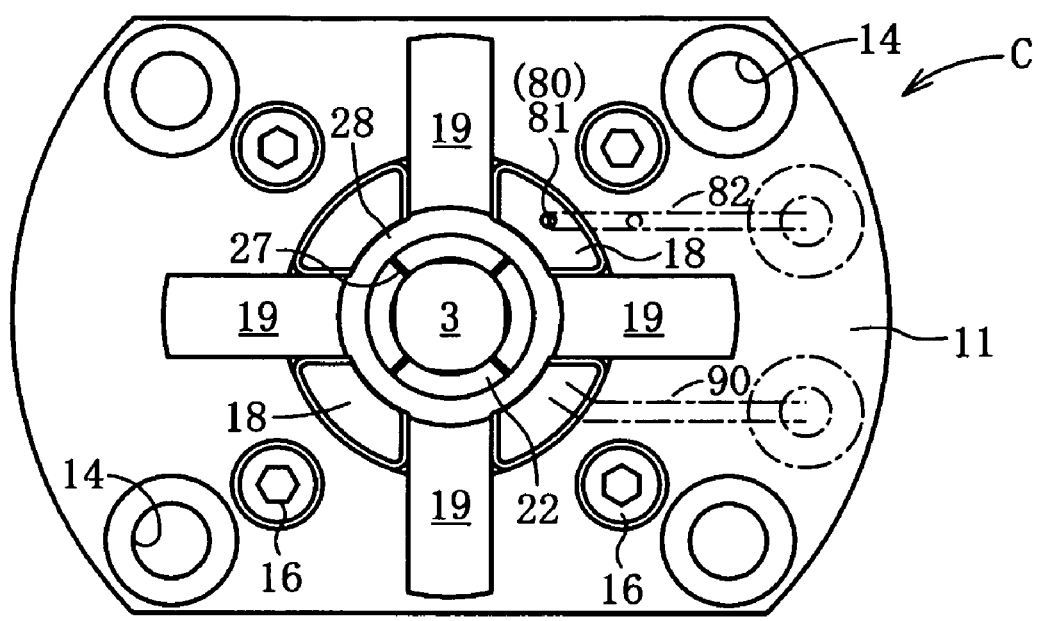
FIG. 1 is a plan view of a clamp device according to an embodiment of the present invention.

W: workpiece
H: hole
C, CA, CB: clamp devices
1: main body member
2, 2A, 2B: grip members
2b, 2d: separated grip members
3, 3B: clamp rods
4: hydraulic cylinder
5: annular pressure receiving member
18: seating surface
22, 161: workpiece mounting surfaces
23: annular guard portion
24: grip claw portion
26, 26B: base end guard portion
26b: tapered barrel portion
26c: tapered surface
28: scraper
31: tapered shaft portion
33a: tapered engagement portion
41: cylinder bore
42: piston member
44: tubular piston rod
45: clamping hydraulic chamber
46: unclamping hydraulic chamber
52: O-ring
80: seating sensor
81: pressurized air ejection hole
160: workpiece mounting surface forming member
170: diameter reduction mechanism

DESCRIPTION OF THE PREFERRED EMBODIMENTS

In the following, best modes for implementation of the present invention will be explained on the basis of embodiments.

Embodiment 1

Figure 2:
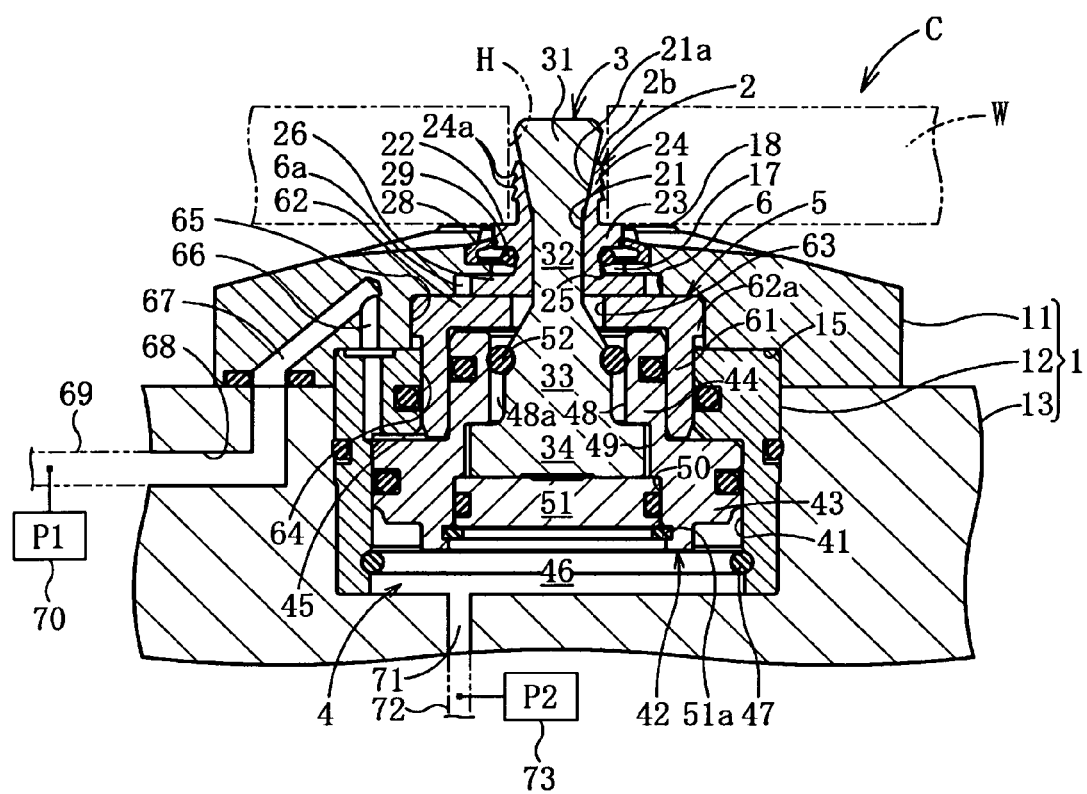
FIG. 2 is a vertical sectional view of the clamp device (workpiece loaded state) of FIG. 1.
Figure 3:
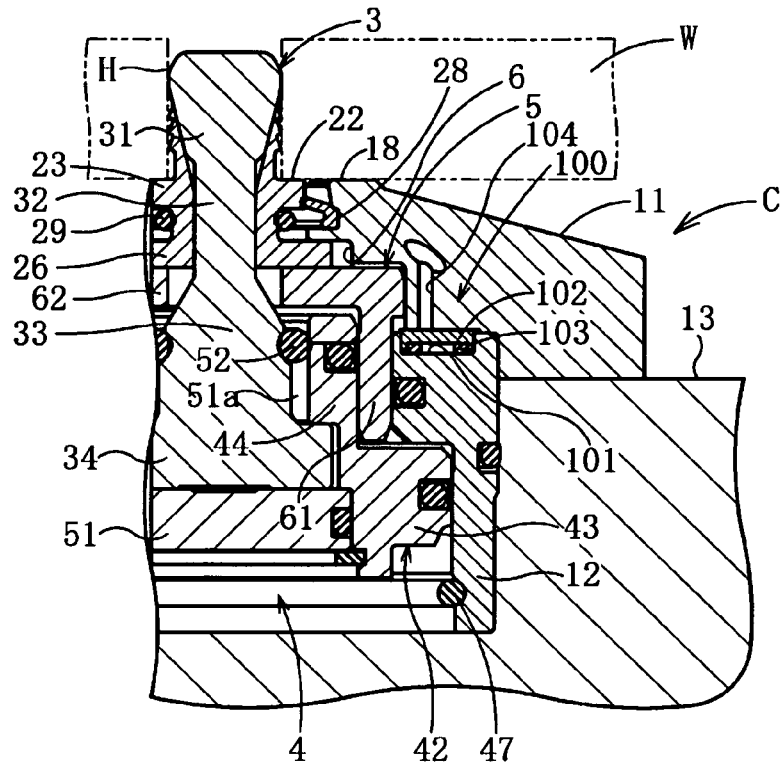
FIG. 3 is a partial vertical sectional view of the clamp device (clamped state) of FIG. 1.

As shown in FIGS. 1 through 3, this clamp device C comprises a main body member 1, a grip member 2, a clamp rod 3, a hydraulic cylinder 4 (i.e. a fluid pressure cylinder) that can drive the grip member 2 and the clamp rod 3 in the axial direction (the vertical direction), and an annular pressure receiving member 5 that is included in the hydraulic cylinder 4. The main body member 1 consists of an upper main body member 11, a lower main body member 12, and a base body member 13.

The upper main body member 11 has an almost elliptical shape as seen in plan view, and this upper main body member 11 is fixed to the base body member 13 by four bolts that are inserted into four bolt holes 14. And the lower main body member 12 is a tubular member in which a cylinder bore 41 is formed, with the upper end portion of this lower main body member 12 being fitted into a concave portion 15 on the lower end of the upper main body member 11, and being fixed to the upper main body member 11 by four bolts 16.

As shown in FIGS. 1 through 3, the grip member 2 is provided so as to pierce vertically through an aperture 17 in the center portion of the upper main body member 11. Seating surfaces 18 consisting of four circular arc shapes surrounding the grip member 2 are defined on the upper surface of the upper main body member 11, and, in the state in which the workpiece W is clamped, the workpiece W can be seated against these seating surfaces 18. Four concave grooves 19, through which pressurized air may flow to be blown, are formed on the upper surface of the upper main body member 11 in the shape of a + sign. Except for the four seating surfaces 18 and the four concave grooves 19, the upper surface of the upper main body member 11 is formed as a portion of a conical surface that has a gentle angle of slope.

The grip member 2, which is shaped approximately as a sleeve, is made so that it can be expanded and shrunk down in the radial direction, and is capable of being inserted into a hole H in the workpiece W and is capable of gripping the inner circumferential surface of the hole H. This grip member 2 comprises: a rod insertion hole 21; a workpiece mounting surface 22 that, when the grip member 2 is in an advanced position (i.e. an upper limit position) in which it is shifted towards the workpiece W, can receive and stop the workpiece W in a position that is more advanced than the seating surfaces 18; an annular guard portion 23 upon which this workpiece mounting surface 22 is defined; a grip claw portion 24 that projects from this annular guard portion 23 in the advance direction; a base end guard portion 26 that is formed on the end opposite to the grip claw portion 24 with respect to this annular guard portion 23; and an annular groove 25 that is formed between the annular guard portion 23 and the base end guard portion 26. This grip member 2 consists of four separated grip members 2b. That is, the annular guard portion 23, grip claw portion 24, annular groove 25, and base end guard portion 26 are separated into four equal parts in the circumferential direction by slits 27.

The grip member 2 is built as a metallic member, and teeth 24a are formed in three stages on the outer circumferential surface of the grip claw portion 24 of each of the separated grip members 2b of the grip member 2, so as to be able easily to grip the inner circumferential surface of the hole H in the workpiece W. And the rod insertion hole 21 is formed in the grip member 2, into which the clamp rod 3 is inserted and through which it passes. The portion of the rod insertion hole 21 that corresponds to the grip claw portions is formed as a tapered hole portion 21a into which a tapered shaft portion 31 of the clamp rod 3 is engaged so as to fit closely.

As shown in FIGS. 1 through 3, a scraper 28 that is made from an elastic material such as rubber or synthetic resin is installed in the aperture 17 of the upper main body member 11, and is slidable in contact against the outer circumferential surface of the annular guard portion 23 of the grip member 2. And an O-ring 29 is installed in the annular groove 25 of the grip member 2, and biases the separated grip claw portions 24 and the annular guard portion 23 in the direction of radial reduction.

The base end guard portion 26 of the grip member 2 is contained in a concave circular portion 6 of the upper main body member 11, and is installed in a state of being sandwiched between an upper wall portion of the concave circular portion 6 and a horizontal plate portion 62 of the annular pressure receiving member 5. An annular gap 6a is formed in the interior of the concave circular portion 6, outside the base end guard portion 26. The grip member 2 is installed so that it can be raised and lowered integrally together with the annular pressure receiving member 5, and moreover so that, by elastic deformation of the scraper 28 and the annular gap 6a, it can be shifted in horizontal directions orthogonal to the axis of the hydraulic cylinder 4.

The clamp rod 3 comprises the tapered shaft portion 31, a small diameter rod portion 32 that extends downward from the lower end of this taper shaft portion 31, a large diameter rod portion 33 that continues downward to the lower end of this small diameter rod portion 32, and a large diameter guard portion 34 that continues downward from the lower end of this large diameter rod portion 33, all formed integrally together. The tapered shaft portion 31 and the small diameter rod portion 32 are inserted through the rod insertion hole 21 of the grip member 2. The above described tapered shaft portion 31 is formed at the upper end portion of the clamp rod 3 so that its diameter increases in the upward direction, and this tapered shaft portion 31 is fitted into the tapered hole portion 21a of the grip member 2 and engaged therewith.

As shown in FIGS. 1 through 3, the hydraulic cylinder 4 is a device for driving the grip member 2 and the clamp rod 3 forwards and backwards (up and down) along their axial direction. This hydraulic cylinder 4 comprises a cylinder bore 41 that is formed in the lower main body member 12 and the base body member 13 in a vertical orientation, a piston member 42 that is installed in the cylinder bore 41, a tubular piston rod 44 that is integral with the piston member 42 and extends upwards from a piston portion 43 thereof, a clamping hydraulic chamber 45 above the piston portion 43 and an unclamping hydraulic chamber 46 below the piston portion 43, and the annular pressure receiving member 5.

The bottom end of the cylinder bore 41 is blocked by the base body member 13, and a stop ring 47 that regulates the downward shifting of the piston member 42 is installed in an annular groove in the lower portion of the cylinder bore 41 adjacent to its lower end. The piston member 42 is received and stopped at its lower limit position by a stop ring 47. A central hole is formed in the piston member 42, and this central hole is defined by an upper portion small diameter hole 48 that is formed in the tubular piston rod 44, a medium diameter hole 49 at a middle portion, and a lower portion large diameter hole 50. A sealing member 51 is installed in the large diameter hole 50, and the sealing member 51 is retained by a stop ring 51a.

The large diameter rod portion 33 of the clamp rod 3 is positioned within the small diameter hole 48, while its large diameter guard portion 34 is positioned within the medium diameter hole 49. An annular gap 48a of about 2 mm is defined between the large diameter rod portion 33 and the inner circumferential surface of the small diameter hole 48, and a thick O-ring 52 (i.e. an elastic ring member) is installed in an annular groove on the external circumference of the large diameter rod portion 33, with the O-ring 52 being installed in a state of being slightly compressed between the large diameter rod portion 33 and the tubular piston rod 44.

The thickness of the large diameter guard portion 34 is almost equal to the thickness of the medium diameter hole 49. And a slight gap is defined between the outer circumferential surface of the large diameter guard portion 34 and the inner circumferential surface of the medium diameter hole 49. For this reason, while the clamp rod 3 shifts integrally with the piston member 42 to move upwards and downwards, it is also shiftable relatively to the piston member 42 in horizontal directions orthogonal to the axis of the hydraulic cylinder 4, due to elastic deformation of the O-ring 52. And the grip member 2 can also shift integrally with the clamp rod 3 in horizontal directions orthogonal to the axis described above. Here, the scraper 28 and the O-ring 52 correspond to an "elastic biasing means" that elastically biases the grip member 2 and the clamp rod 3, so as to make the common axis of the grip member 2 and the clamp rod 3 coincide with the axis of the hydraulic cylinder 4.

As shown in FIGS. 1 through 3, the annular pressure receiving member 5 comprises a pressure receiving barrel portion 61 and the horizontal plate portion 62 that extends at the upper end of this pressure receiving barrel portion 61 upon which surface the base end guard portion 26 of the grip member 2 is mounted, The base end surface of the grip member 2 is supported on the upper surface of this horizontal plate portion 62. The large diameter rod portion 33 of the clamp rod 3 is passed through a circular hole 63 in the center portion of the horizontal plate portion 62 with some free play therebetween, and an engagement guard 62a whose diameter is slightly larger than that of the pressure receiving barrel portion 61 is formed on the external circumferential portion of the horizontal plate portion 62. And an upper cylinder bore 64 is formed in the lower main body member 12, extending at the upper end of the cylinder bore 41 and having a diameter smaller than that of the cylinder bore 41.

A containment hole 65 is formed in the upper main body member 11, extending from the upper end of the upper cylinder bore 64. The thickness of the containment hole 65 is greater than that of the engagement guard 62a, and for example may be 1.2~2.0 mm larger. The pressure receiving barrel portion 61 of the annular pressure receiving member 5 is installed in an annular hole between the inner circumferential surface of the upper cylinder bore 64 and the tubular piston rod 44 in a hydraulic fluid-tight manner so as to slide freely therein in the vertical direction, and the horizontal plate portion 62 is installed in the containment hole 65 so as to slide freely therein in the vertical direction. It should be understood that a plurality of seal members (not denoted by reference numerals) are provided in order to prevent leakage of hydraulic fluid from the hydraulic chambers 45 and 46.

The lower end of the pressure receiving barrel portion 61 of the annular pressure receiving member 5 faces into the clamping hydraulic chamber 45 and receives the pressure of hydraulic pressure therein. This clamping hydraulic chamber 45 is connected to a hydraulic pressure supply source via hydraulic passages 66 through 69, and furthermore a hydraulic pressure detection sensor 70 is provided that detects the pressure of hydraulic pressure in the hydraulic passage 69. And the unclamping hydraulic chamber 46 is connected to a hydraulic pressure supply source via hydraulic passages 71 and 72, and furthermore a hydraulic pressure detection sensor 73 is provided that detects the pressure of hydraulic pressure in the hydraulic passage 72. The annular pressure receiving member 5 is shiftable along a predetermined stroke in the direction parallel to the axis of the clamp rod 3 between a first position in which the workpiece mounting surface 22 of the grip member 2 is positioned as being advanced more outwards (i.e. upwards) than the seating surfaces 18, and a second position in which the workpiece mounting surface 22 is positioned as being pulled back (i.e. lowered) more than the seating surfaces 18. Additionally, "hydraulic pressure" means pressurized oil, in this specification.

As shown in FIGS. 1 through 4, a seating sensor 80 is provided that, in the state in which a workpiece W has been clamped, detects that the lower surface of the workpiece W is closely contacted against the seating surfaces 18. This seating sensor 80 comprises a pressurized air ejection hole 81 that opens to one of the seating surfaces 18, an air passage 82 formed in the upper main body member 11 so as to communicate with this pressurized air ejection hole 81 and an air passage 83 formed in the base body member 13, a pressurized air supply source that supplies pressurized air to this air passage 83, and a pressure switch 84 or the like that detects that the pressure of the pressurized air in the air passage 83 has risen to or above a set pressure.

As shown in FIG. 1, an air passage 90 that is similar to the air passage 82 is formed in the upper main body member 11, and pressurized air is supplied from this air passage 90 to the concave circular portion 6 and the annular groove 25, so that the pressurized air flows from the four slits 27 of the grip member 2 to the four seating surfaces 18, and thereby air is blown against the four seating surfaces 18, so that these seating surfaces 18 are cleaned.

Next, a poor clamping detection mechanism 100 for detecting poor clamping will be explained.

Figure 4:
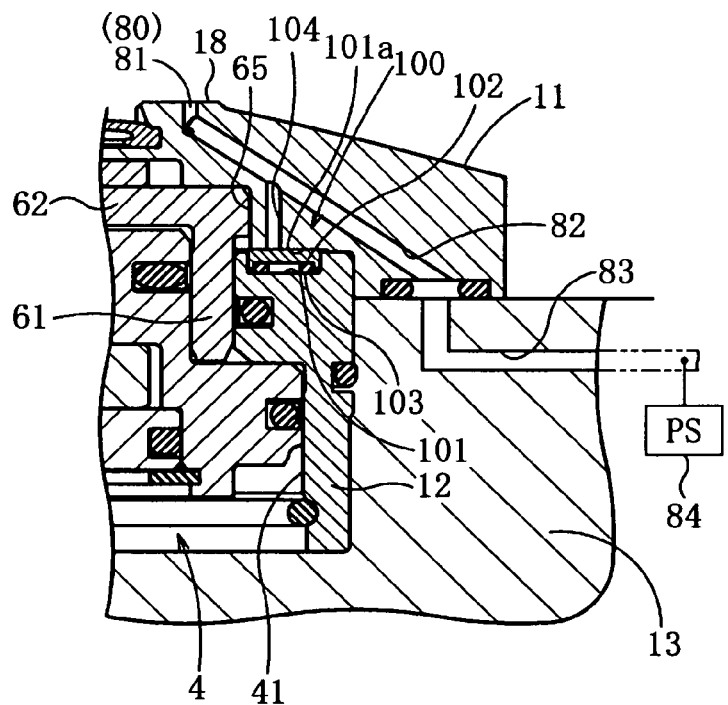
FIG. 4 is a partial vertical sectional view of the clamp device of FIG. 1.
Figure 5:
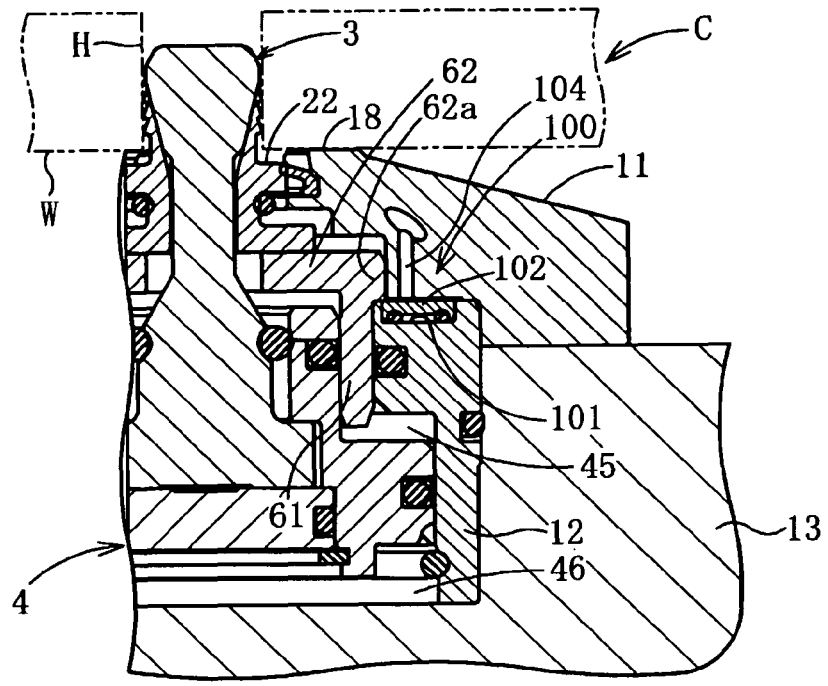
FIG. 5 is a partial vertical sectional view of the clamp device (poorly clamped state) of FIG. 1.
Figure 6:
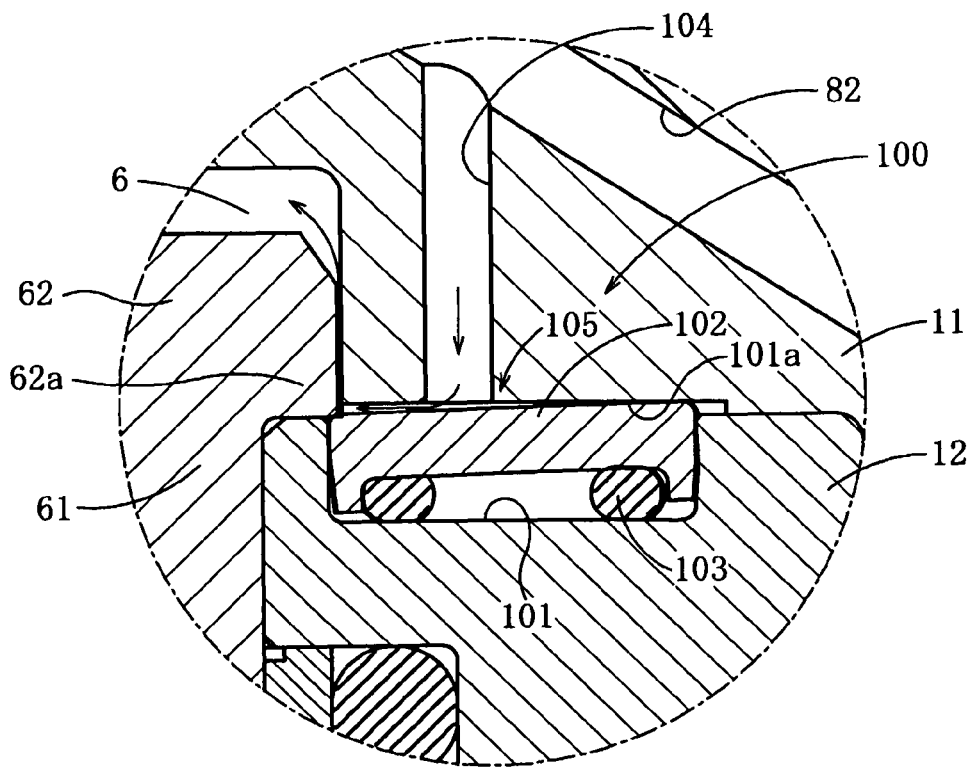
FIG. 6 is an enlarged vertical sectional view showing the essential portions of a poor clamping detection mechanism of the clamp device of FIG. 5.

As shown in FIGS. 4 through 6, along with a shallow concave circular portion 101 being formed at the upper end portion of the lower main body member 12, below the air passage 82, an extremely shallow concave circular portion 101*a* is formed upon the lower surface of the upper main body member 11, opposing the concave circular portion 101. A circular valve plate 102 (i.e. a valve member) is received in these concave circular portions 101 and 101*a* so as to open or close an air passage 104, and an O-ring 103 (i.e. a valve biasing member) is installed below the lower surface of the valve plate 102, so as to bias the valve plate 102 upwards to a position in which it closes the air passage 104. The air passage 104 is formed to extend from the air passage 82, and thereby pressurized air is supplied to above the upper surface of the valve plate 102.

Due to the formation of the concave circular portion 101*a*, when the annular pressure receiving member 5 has been lowered as far as its lower limit position, the engagement guard 62*a* of the annular pressure receiving member 5 comes to contact against the valve plate 102 and acts to press the valve plate 102 downwards to its position to open the air passage 104 (refer to FIG. 6). And, in the state in which the annular pressure receiving member 5 is not lowered as far as its lower limit position, the seating sensor 80 operates normally, because the lower end of the air passage 104 is closed by the valve mechanism 105 that includes the valve plate 102 and the O-ring 103. However if, due to poor clamping as will be described hereinafter, the annular pressure receiving member 5 is lowered to its maximum limit and the engagement guard 62*a* presses the valve plate 102 downward, then the valve mechanism 105 is opened and, since the pressurized air in the air passage 104 leaks out to the containment hole 6 and leaks to the aperture 17 from the containment hole 6, accordingly the air pressure in the air passages 82 and 104 ceases to be elevated.

By the seating sensor 80 detecting that seating of the workpiece W has not been detected even after the clamp operation, it is possible to detect poor clamping, as will be described hereinafter.

It should be understood that the hydraulic pressure supply source, the pressurized air supply source, the hydraulic pressure detection sensors 70 and 73, and the pressure switch 84 are electrically connected to a control unit not shown in the figure, and are controlled by the control unit.

Figure 7:
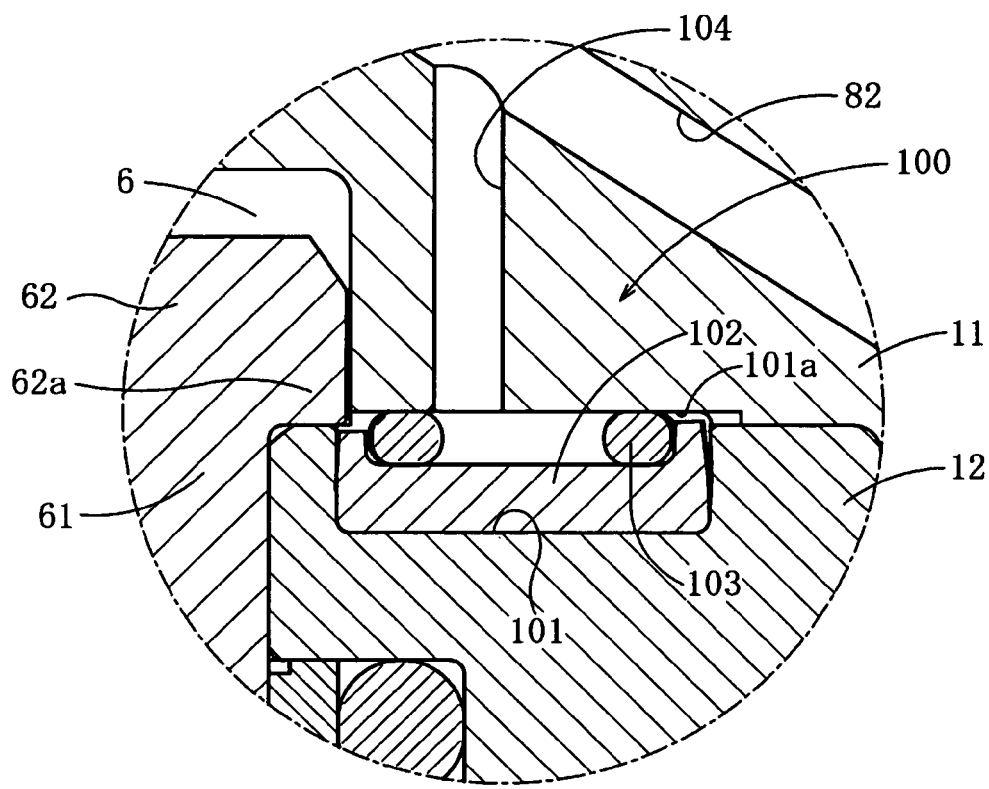
FIG. 7 is an enlarged vertical sectional view showing the essential portions of the poor clamping detection mechanism of the clamp device of FIG. 5 in a state in which it is arranged not to be allowed to function.

Here, if it is not desired to use the function of this poor clamping detection mechanism 100, then it will be acceptable to install the valve plate 102 and the O-ring 103 into the concave circular portions 101 and 101*a* in the reverse vertical arrangement, as shown in FIG. 7. Since by doing this the upper end of the valve plate 102 is positioned lower than the upper end of the concave circular portion 101 of the lower main body member 12, accordingly, even if the annular pressure receiving member 5 is lowered as far as its lower limit position, still the state in which the air passage 104 is closed by the O-ring 103 is maintained, since the engagement guard 62*a* of the annular pressure receiving member 5 does not contact against the valve plate 102.

The operation and the advantages of the clamp device C described above will now be explained. When a workpiece W is to be fixed by the clamp device C, first, initially, the hydraulic pressure having almost the same pressure is supplied to the clamping hydraulic chamber 45 and to the unclamping hydraulic chamber 46. When this is done, since the pressure receiving area of the piston member 42 in the unclamping hydraulic chamber 46 is larger than the pressure receiving area in the clamping hydraulic chamber 45, accordingly, as shown in FIG. 2, the piston member 42 is raised up to its upper limit position and remains in the stopped state. Furthermore, the annular pressure receiving member 5 is held in its upper limit position because it experiences the hydraulic pressure in the clamping hydraulic chamber 45, and the grip member 2 is also held in its upper limit position, with the workpiece mounting surface 22 being held in a position slightly higher than the seating surfaces 18.

In this state, the workpiece W is loaded and, as shown in FIG. 2, the grip member 2 and the clamp rod 3 are inserted into the hole H of the workpiece W, and the workpiece W is supported by the workpiece mounting surface 22. Since, in this manner, a structure is provided in which first the workpiece W is supported by the workpiece mounting surface 22 which is in a position higher than the seating surfaces 18, and thereafter the workpiece W is supported by the seating surfaces 18 in the clamped state, accordingly it is possible to prevent the seating surfaces 18 from suffering damage due to the workpiece W while the workpiece W is being loaded. Moreover, since it is arranged for the seating sensor 80 not to operate before clamping, but rather for the seating sensor 80 to operate when the workpiece W is seated upon the seating surfaces 18 and has been fixed with the predetermined clamping force, accordingly it is possible to enhance the reliability of the seating sensor 80.

Next, the pressure of hydraulic pressure in the unclamping hydraulic chamber 46 is changed over to a predetermined hydraulic pressure that is lower than the pressure of hydraulic pressure in the clamping hydraulic chamber 45, so that a quite strong predetermined hydraulic force operates upon the piston member 42 in the downward direction. When this is done, although the annular pressure receiving member 5 which receives the hydraulic pressure in the clamping hydraulic chamber 45 is held in its upper limit position in a similar manner to that described above and the grip member 2 is also held in its upper limit position, since the hydraulic pressure operates on the piston member 42 in the downward direction and the piston member 42 is driven downward, accordingly the clamp rod shifts downward slightly relatively to the grip member 2.

As a result, the grip claw portion 24 of the grip member 2 is driven by the tapered shaft portion 31 of the clamp rod 3 so that its diameter expands, and bites into the inner circumferential surface of the hole H in the workpiece W and is put into a state of engagement therewith. When, in this state, the pressure of hydraulic pressure in the unclamping hydraulic chamber 46 is reduced down to drain pressure, a large hydraulic force in the downwards direction acts upon the piston member 42, and, since it is impossible for the grip member 2 and the clamp rod 3 to shift relatively to one another, accordingly, as shown in FIG. 3, the piston member 42, the grip member 2, the clamp rod 3, and the annular pressure receiving member 5 are driven downwards slightly as one unit, and the workpiece W is seated upon the seating surfaces 18 and stops in the clamped state in which it is pressed strongly thereagainst.

At this time, as shown in FIG. 3, since some gap remains between the engagement guard portion 62*a* of the annular pressure receiving member 5 and the upper end of the lower main body member 12, the valve mechanism 105 of the poor clamping detection mechanism 100 is kept in the closed state. For this reason, it is possible to detect with the seating sensor 80 that the workpiece W has been clamped with the predetermined clamping force and has been seated against the seating surfaces 18.

Figure 8:
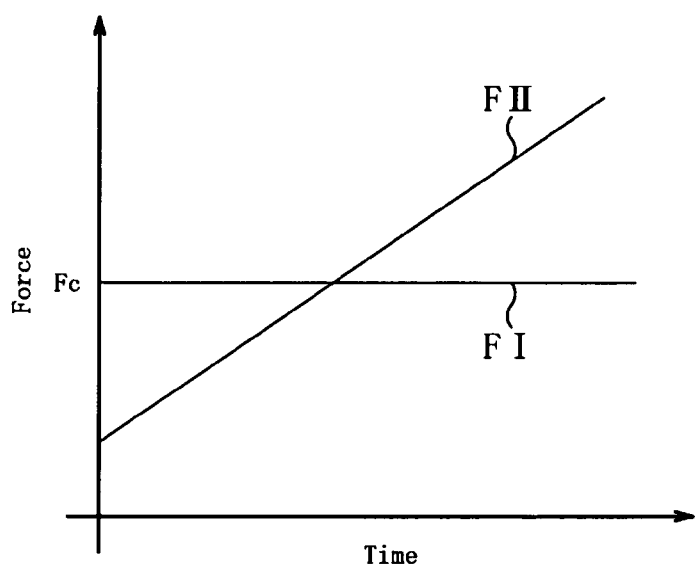
FIG. 8 is a diagram showing gripping member supporting force and clamping operation force.

Now the relationship between the operation by which the grip member 2 catches the workpiece (i.e. the grip claw portion 24 bites into the inner circumferential surface of the hole H in the workpiece W) and the operation of clamping the workpiece W will be explained in detail on the basis of FIG. 8. In FIG. 8, the pressure of hydraulic pressure that is supplied to the clamping hydraulic chamber 45 is denoted by P1, the pressure of hydraulic pressure that is supplied to the unclamping hydraulic chamber 46 is denoted by P2, FI denotes the force in the upwards direction that acts upon the grip member 2 due to the pressure P1, and FII denotes the force in the downward direction that acts upon the clamp rod 3 due to the pressure P1 and the pressure P2.

Although FI is kept at Fc since the pressure P1 is kept constant from the start, and although the pressure P2 decreases after the workpiece W is supported on the workpiece mounting surfaces 22 and the grip member 2 and the clamp rod 3 have been inserted into the hole H in the workpiece W, at this time FII is applied in the downwards direction upon the clamp rod 3, so that FII increases along with decrease of the pressure P2. Here, at least in the state in which FII is lower than Fc, the grip member 20 is not pulled downwards by the clamp rod 3, but rather is subjected to FII from the clamp rod 3 so that its diameter is increased.

And when FII becomes greater than Fc, although the clamping operation starts in which the grip member 2 and the clamp rod 3 are lowered together as one unit, since up to this time, the diameter of the grip member 2 sufficiently increases, accordingly the grip member 2 reliably is squeezed out against the workpiece W, and, since it is possible to start the clamp operation in this state, accordingly it is possible reliably to prevent the grip claw portions 24 from slipping relatively downwards with respect to the inner circumferential surface of the hole H in the workpiece W, and reliably to clamp the workpiece W.

Now, if the workpiece W is a cast product, and the diameter of the hole H therein is not constant, but rather it is a hole H that increases in diameter downwards, or if the workpiece W is made from a hard metallic material, then, when the hydraulic pressure in the unclamping hydraulic chamber 46 reaches drain pressure and the driving downwards of the piston member 42 starts, sometimes it may happen that the grip claw portions 24 may slip relatively downwards with respect to the inner circumferential surface of the hole H.

In this case, as shown in FIGS. 5 and 6, since the annular pressure receiving member 5 is lowered to its lower limit position although the workpiece W is seated upon the seating surfaces 18, accordingly the valve mechanism 105 of the poor clamping detection mechanism 100 is in the open state, and the air pressure in the air passages 82 and 104 is not elevated, so that it is possible to detect that the workpiece W is not correctly clamped, since the pressure switch 84 of the seating sensor 80 does not become ON. In this case, the workpiece W is in an incompletely clamped state, and sufficient clamping force is not being generated. Since the air supply system of the poor clamping detection mechanism 100 is built in common with the air supply system for the seating sensor 80, accordingly the air supply system becomes simple.

On the other hand, in a case such as one in which the workpiece W is clamped by the clamp device C while disposed in a horizontally oriented attitude, if when the workpiece W was loaded the clamp operation was still performed even in a state with a gap being present between the workpiece W and the workpiece mounting surface 22, then the shift amount of the grip member 2 as it shifts until the workpiece W seats against the seating surfaces 18 becomes great, and since thus, in a similar manner to that described above, the valve mechanism 105 of the poor clamping detection mechanism 100 is in the open state, accordingly it is possible to detect this poor clamping with the seating sensor 80, in a similar manner to that described above. It should be understood that it is also possible to detect poor clamping in a similar manner to that described above, if clamping is performed in a state in which some foreign body is present squeezed between the workpiece mounting surface 22 and the workpiece W.

If a workpiece W is to be clamped with a plurality of these clamp devices C, and if the positions of the centers of some of the holes H in the workpiece W are slightly deviated due to manufacturing errors in the workpiece W, then when the clamp rods 3 and the grip members 2 are inserted into the holes H, or upon clamping, due to elastic deformation of the scrapers 28 and the O-rings 52, the common axes of the clamp rods 3 and the grip members 2 will come to deviate from the axes of their hydraulic cylinders 4.

However when the clamp devices C are returned to their unclamped states after machining of the workpiece W, then, due to the elastic force of the scrapers 28 and the O-rings 52, the common axes of the clamp rods 3 and the grip members 2 automatically return so that they coincide with the axes of their hydraulic cylinders 4. In this case, since elastic forces are applied and are released at two spots above and below upon the clamp rods 3, accordingly it becomes possible to release the clamp rods 3 smoothly without any play; and since for this reason manual operation is not required in order to perform the task of returning these axes so that they coincide with one another each time that the system goes into the unclamped state, accordingly it is possible to enhance the working efficiency for the task of clamping the workpiece W. Moreover, due to the provision of the O-rings 52, it is possible reliably to ensure smooth sliding shifting of the clamp rods 3 in directions orthogonal to the axial direction, while reliably preventing the ingress of foreign matter such as filings into the sliding portions between the large diameter guard portions 34 of the clamp rods 3 and the medium diameter holes 49 of the tubular piston rods 44.

Now, when the grip member 2 is to be exchanged, this can be performed by executing the following procedure. First, the lower main body member 12 and the upper main body member 11 that is engaged by bolts to the base body member 13 are removed. In this case, although the upper main body member 11 is removed by being shifted upwards, it is possible for this procedure to be performed without the teeth 24a causing any damage to the scraper 28 that is installed to the upper main body member 11, since at this time the scraper 28 is positioned more outwardly in the radial direction than the teeth 24a of the grip member 2.

And, when the upper main body member 11 is to be taken off, since the grip member 2 is split perfectly into four parts, accordingly it is possible to remove each of the divided portions of the grip member in a simple manner, without any interference with the clamp rod 3. And when a new grip member 2 is to be installed, while it is possible to perform the above task in the reverse order, in particular, even when fitting the upper main body member 11, it is possible for this procedure to be performed without the teeth 24a of the grip member 2 that has been newly installed causing any damage to the scraper 28 installed in the upper main body member 11, since the scraper 28 is positioned more outwardly in the radial direction than the teeth 24a of the grip member 2.

Embodiment 2

Figure 9:
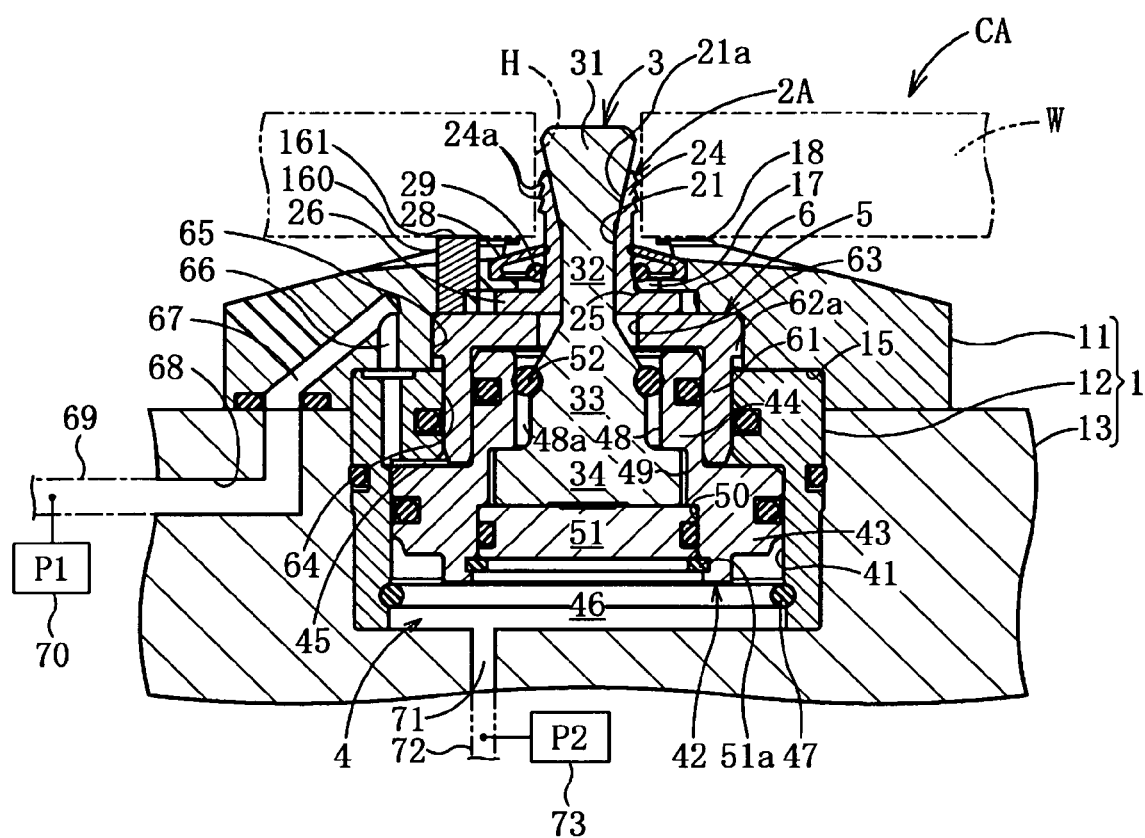
FIG. 9 is a figure corresponding to FIG. 4 in a second embodiment.

In the description of this embodiment, to structures that are similar to ones of the clamp device C of the above embodiment, the same reference numerals are appended, and explanation thereof will be omitted, with only the structures that are different being explained. As shown in FIG. 9, along with this clamp device CA being provided with a grip member 2A that has a different structure from the grip member 2 of the first embodiment, also it comprises workpiece mounting surfaces 161 that, when the grip member 2A is in an advanced position, can receive and stop a workpiece W at a position that is more advanced than the seating surfaces 18. These workpiece mounting surfaces 161 are formed upon a workpiece mounting surface forming member 160 that is disposed in the vicinity of the exterior of the external circumference of the grip member 2A and that, during clamping operation, shifts integrally with the grip member 2A in the direction parallel to the axis of the clamp rod 3. In this grip member 2A, the annular guard portion 23 of the grip member of the first embodiment is omitted.

This workpiece mounting surface forming member 160 is appropriately separated in the circumferential direction, thus consisting of a plurality of separated members (for example, four thereof). Each of this plurality of separated members of the workpiece mounting surface forming member 160 is fixed by bolts or the like to the upper surface portion of the annular pressure receiving member 5, and the smooth workpiece mounting surfaces 161 are defined on their upper end surfaces. These workpiece mounting surfaces 161 are provided so that, in the unclamped state, they are positioned more upward than the seating surfaces 18. It should be understood that a plurality of holes for allowing the plurality of separated members of the workpiece mounting surface forming member 160 to project is formed in the upper main body member 11. It would also be acceptable to make the workpiece mounting surface forming member 160 as a single member.

Embodiment 3

Figure 10:
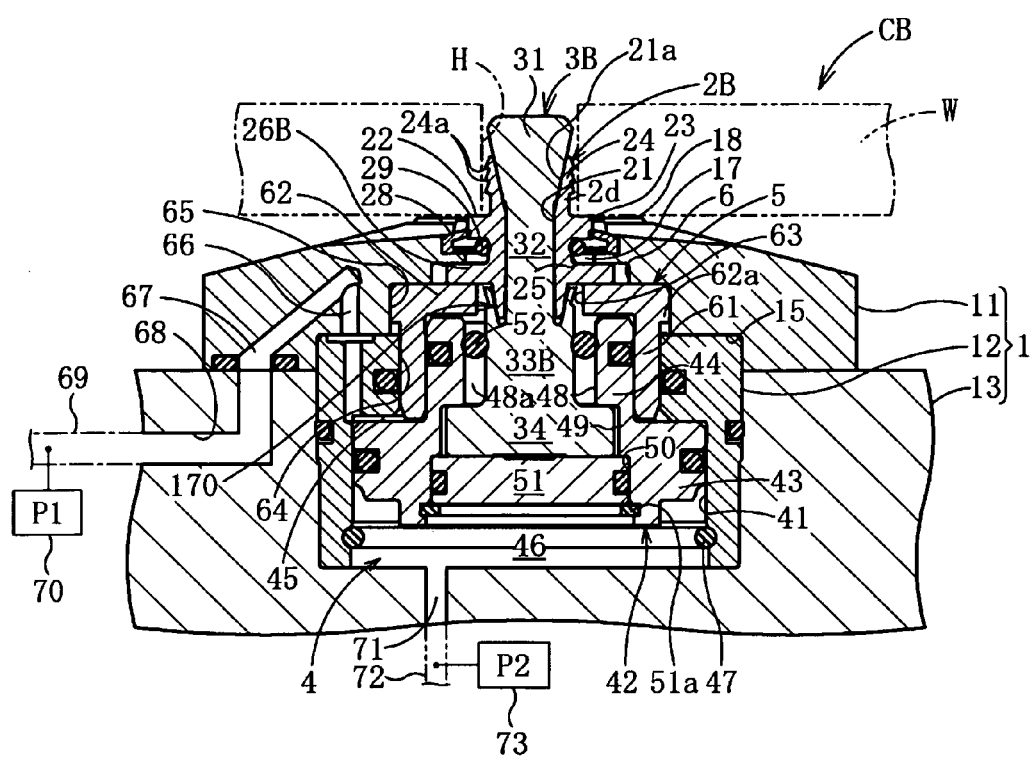
FIG. 10 is a figure corresponding to FIG. 2 in a third embodiment.
Figure 11:
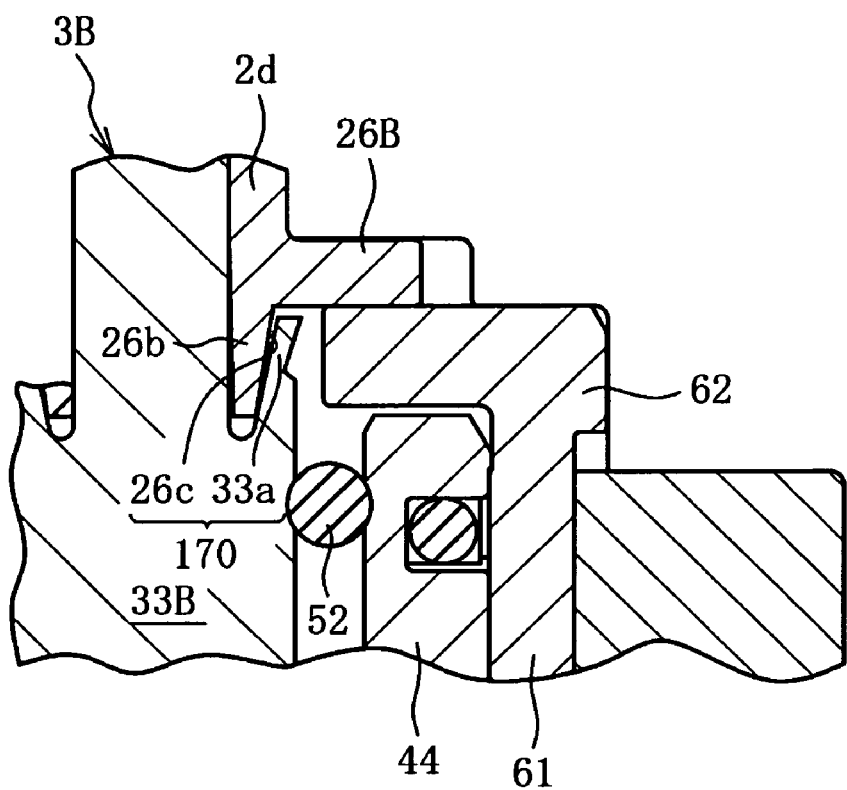
FIG. 11 is an enlarged partial sectional view of a diameter reduction mechanism of the third embodiment.

In the description of this embodiment, to structures that are similar to ones of the clamp device C of the above embodiment, the same reference numerals are appended, and explanation thereof will be omitted, with only the structures that are different being explained. As shown in FIGS. 10 and 11, this clamp device CB includes a grip member 2B having a structure that is different from that of the grip member 2 of the first embodiment, and also a clamp rod 3B having a structure that is different from that of the clamp rod 3 of that embodiment. And a diameter reduction mechanism 170 is provided that, when the clamp device CB is returned from the clamped state to the unclamped state, causes the plurality of separated grip members 2d of the grip member 2B to approach towards the clamp rod 3B, thus being set into the diameter reduced state.

A tapered barrel portion 26b is formed at the base end portion of the grip member 2B and projects downwards from the internal circumferential portion of its base end guard portion 26B, with the outer circumferential surface of this tapered barrel portion 26b being formed as a tapered surface 26c whose diameter reduces downwards. Since, by being separated into four equal parts in the circumferential direction by four slits 27 just as with the grip member 2 of the first embodiment, this grip member 2B consists of four separated grip members 2d, accordingly the tapered barrel portion 26b is also separated by the four slits 27 into four equal parts in the circumferential direction.

A tapered engagement portion 33a is formed integrally with the upper end portion of the large diameter rod portion 33B of the clamp rod 3B, and engages from below with the tapered surface 26c of the tapered barrel portion 26b when the clamping is released. Although the inner surface of this tapered engagement portion 33a is also formed as a tapered surface whose diameter increases upwards, the slope angle of this tapered surface with respect to the vertical is slightly greater than the slope angle of the tapered surface 26c with respect to the vertical. The above-mentioned diameter reduction mechanism 170 includes the tapered engagement portion 33a of the clamp rod 3B and the tapered surface 26c of the tapered barrel portion 26b.

After machining has ended in the state with the workpiece W clamped, when this clamp device CB is to be changed from its clamped state to its unclamped state, along with the axes of the grip member 2B and the clamp rod 3B being shifted in the horizontal direction by the elastic force of the scraper 28 and the O-ring 52 so as to coincide with the axis of the hydraulic cylinder 4, also the clamp rod 3B is driven in the advance direction (i.e. upwards) by the hydraulic cylinder 4. At this time, the tapered engagement portion 33a of the clamp rod 3B engages closely from below with the tapered surface 26c of the tapered barrel portion 26b. Since, due to this, a force acts upon the tapered barrel portion 26b from the tapered engagement portion 33a to cause the diameter of this tapered barrel portion 26b to be reduced, accordingly the four separated grip members 2d are pressed in the radial reduction direction so that they approach the clamp rod 3B to the maximum limit, and thereby the diameter of the grip member 2B is reduced to the maximum limit towards the clamp rod 3B.

Since this clamp device CB is provided with the diameter reduction mechanism 170 in this manner, and since this diameter reduction mechanism 170 comprises the tapered surface 26c that is formed upon the tapered barrel portion 26b of the base end portion of the grip member 2B so as to reduce in diameter downward, and the tapered engagement portion 33a which is formed upon the clamp rod 3B so as to be able to engage from below with this tapered surface 26c and which moreover increases in diameter upwards, and since during clamping release the four separated grip members 2d are brought to their diameter reduced state in which the are approached towards the clamp rod 3B to the maximum limit, accordingly it is possible for the diameter of the four separated grip members 2d reliably to be reduced by this diameter reduction mechanism 170, each time the clamp device CB is put into its unclamped state. Due to this, even in a case such as when during clamping the grip claw portion 24 has bitten into the inner surface of the hole H in the workpiece W and become stuck therein, it is possible reliably to reduce the diameter of the grip member 2B during clamping release, so that it is possible to perform clamping of the workpiece with this clamp device CB smoothly and efficiently.

Variant examples in which the embodiments described above are partially changed will now be explained.

1) Instead of the hydraulic cylinder 4, it would also be acceptable to provide an air cylinder that operates with pressurized air.

2) For a person skilled in the art, it is possible to implement the above embodiments in various forms by supplementing various changes, and the present invention is to be considered as also including this type of variant implementation.

INDUSTRIAL APPLICABILITY

The present invention may be utilized in a clamp device that clamps a workpiece by engaging a grip claw of a grip member into a hole in the workpiece, and by pulling the workpiece against a seating surface.

The invention claimed is:

1. A clamp device, comprising an annular grip member capable of expanding and shrinking in a radial direction and moreover of being inserted into a hole in a workpiece and of gripping an inner circumferential surface of the hole, a clamp rod having a tapered shaft portion fitted into and engaged with the grip member, and a fluid pressure cylinder for driving the grip member and the clamp rod forwards and backwards in an axial direction, comprising:

an upper main body member and a lower main body member to which the grip member, the clamp rod, and the fluid pressure cylinder are attached;

a seating surface formed on the upper main body member for seating the workpiece;

a pressurized air ejection hole for a seating sensor that opens in the seating surface;

a workpiece mounting surface formed on the grip member, the work-piece mounting surface that, when the grip member is at an advanced position in which the grip member is shifted towards the workpiece, can receive and stop the workpiece at a position that is more advanced than the seating surface; and that, during clamp operation in which the grip member and the clamp rod are shifted towards retraction, shifts integrally with the grip member in a direction that is parallel to an axis of the clamp rod;

the fluid pressure cylinder comprises: a cylinder bore; a piston member that is installed in the cylinder bore and is linked operatively to the clamp rod; a tubular piston rod that is formed on the piston member; a clamping fluid chamber that is defined within the cylinder bore on a side of the tubular piston rod, and an unclamping fluid chamber that is defined within the cylinder bore on an opposite side to the clamping fluid chamber relative to a piston portion of the piston member; and an annular pressure receiving member fitted on the exterior of the tubular piston rod and is movable in a direction parallel to the axis of the clamp rod while being capable of receiving the fluid pressure in the clamping fluid chamber, and that receives and stops a base end surface of the grip member;

and the grip member and the clamp rod are disposed so as to be movable as one unit in directions orthogonal to the axis of the fluid pressure cylinder;

and an elastic ring member is provided in a compressed state between the tubular piston rod and the clamp rod, and that, in order for a common axis of the grip member and the clamp rod to coincide with the axis of the fluid pressure cylinder, the elastic ring member elastically biasing the clamp rod in directions orthogonal to the axis of the fluid pressure cylinder.

2. A clamp device according to claim 1, wherein the workpiece mounting surface is formed on one or a plurality of workpiece mounting surface forming members that are arranged around an external circumference of the grip member.

3. A clamp device according to claim 1, comprising a scraper made from an elastic material that is slidable on an outer circumferential surface of an annular guard portion of the grip member, and that, in order for a common axis of the grip member and the clamp rod to coincide with the axis of the fluid pressure cylinder, and elastically biases the grip member in directions orthogonal to the axis of the fluid pressure cylinder.

4. A clamp device according to claim 1, wherein the grip member comprises an annular guard portion on which the workpiece mounting surface is formed, a grip claw portion that extends in the advance direction from the annular guard portion, and a base end guard portion that is formed on an opposite side to the grip claw portion relative to the annular guard portion; and the grip member consisting of a plurality of separated grip members is divided at a plurality of positions around its circumferential direction.

5. A clamp device according to claim 1, wherein the annular pressure receiving member is disposed so as to be shiftable in a direction parallel to the axis of the clamp rod through a predetermined stroke between a first position in which the workpiece mounting surface is at a position that is advanced more than the seating surface in the advance direction, and a second position in which the workpiece mounting surface is at a position that is retracted behind the seating surface.

6. A clamp device according to claim 4, wherein the fluid pressure cylinder is adapted, during clamping, to drive the clamp rod in the retraction direction, and, during clamping release, to drive the clamp rod in the advance direction; and by further comprising a diameter reduction mechanism that, during the clamping release, establishes a diameter reduced state in which the plurality of separated grip members of the grip member are made to approach towards the clamp rod.

7. A clamp device according to claim 6, wherein the diameter reduction mechanism comprises a tapered surface formed on the base end portion of the grip member so as to reduce in diameter downward, and a tapered engagement portion that is formed on the clamp rod so as to be capable of engaging from below with the tapered surface, and that increases in diameter upward.

* * * * *